(12) United States Patent
Ryu et al.

(10) Patent No.: US 12,033,420 B2
(45) Date of Patent: Jul. 9, 2024

(54) DISPLAY DEVICE

(71) Applicant: SAMSUNG DISPLAY CO., LTD., Yongin-si (KR)

(72) Inventors: Ji Hun Ryu, Yongin-si (KR); Kwang Hyun Baek, Yongin-si (KR); Su Yul Seo, Yongin-si (KR); Dong Hwan Lee, Yongin-si (KR); Jae Hyung Jo, Yongin-si (KR); Sung Ho Jin, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/206,294

(22) Filed: Mar. 19, 2021

(65) Prior Publication Data

US 2021/0397803 A1 Dec. 23, 2021

(30) Foreign Application Priority Data

Jun. 23, 2020 (KR) .................. 10-2020-0076720

(51) Int. Cl.
*G06V 40/13* (2022.01)
*G06F 1/16* (2006.01)
(Continued)

(52) U.S. Cl.
CPC ........ *G06V 40/1306* (2022.01); *G06F 1/1652* (2013.01); *G06F 21/32* (2013.01); *G06F 21/84* (2013.01)

(58) Field of Classification Search
CPC .. G06K 9/00006–00093; G06K 9/0002; G06F 1/1652; G06F 21/32; G06F 21/84;
(Continued)

(56) References Cited

U.S. PATENT DOCUMENTS 9,095,016 B2 7/2015 Kwack et al.
2007/0029583 A1* 2/2007 Thomas .................. H10K 39/32
257/252

(Continued)

FOREIGN PATENT DOCUMENTS

KR 10-2019-0053756 5/2019
KR 10-2019-0081292 7/2019
KR 10-2020-0016027 2/2020

*Primary Examiner* — Amr A Awad
*Assistant Examiner* — Aaron Midkiff
(74) *Attorney, Agent, or Firm* — F. CHAU & ASSOCIATES, LLC

(57) ABSTRACT

The present disclosure provides a display device with fingerprint sensor in a manner capable of strengthening a display device integrating the fingerprint sensor. The display device includes a display panel including a display area, a cover panel, a fingerprint sensor, and a reinforcing member. The cover panel is disposed on a rear surface of the display panel and includes an opening. The fingerprint sensor is disposed on the rear surface of the display panel in the opening of the cover panel and includes a sensor layer. The reinforcing member is disposed on a rear surface of the fingerprint sensor. The reinforcing member includes a sidewall surrounding at least one area of the sensor layer while being in contact with the rear surface of the fingerprint sensor, and a bottom surface which extends from the sidewall and is spaced apart from the sensor layer.

18 Claims, 13 Drawing Sheets

(51) Int. Cl.
  *G06F 21/32*     (2013.01)
  *G06F 21/84*     (2013.01)

(58) Field of Classification Search
  CPC ........... G06F 1/16–1698; G06F 3/0412; G06F
      1/1684; G06F 2203/04102; G06F 1/1607;
      G06F 3/044–0448; G06F 3/016; G06F
      3/0433; G09G 2380/02; G01S 7/00–64;
      G01S 15/00–96; B06B 1/00–20; H01L
      27/00–3297; H01L 51/00–56; H01L
      2251/5338; H01L 23/04; G06V
      40/13–1394; G06V 40/1329; G06V
      40/12–1306; G09F 9/301; H04M 1/026;
      H04M 1/0268; H10K 50/84; H10K 59/00;
      H10K 59/40; H10K 2102/311
  See application file for complete search history.

(56) References Cited

U.S. PATENT DOCUMENTS

| | | | | |
|---|---|---|---|---|
| 2014/0352440 | A1* | 12/2014 | Fennell | H10N 30/03 29/25.35 |
| 2016/0350575 | A1* | 12/2016 | Kim | G06V 40/1306 |
| 2017/0364726 | A1* | 12/2017 | Buchan | H01L 41/047 |
| 2018/0120893 | A1* | 5/2018 | Browning | G06F 3/016 |
| 2018/0307885 | A1* | 10/2018 | Zheng | G06V 40/1365 |
| 2018/0322326 | A1* | 11/2018 | Li | H01L 23/562 |
| 2018/0330141 | A1* | 11/2018 | Yang | G06F 1/1684 |
| 2018/0373913 | A1* | 12/2018 | Panchawagh | G01S 7/52079 |
| 2019/0147214 | A1 | 5/2019 | Lee et al. | |
| 2019/0166241 | A1* | 5/2019 | Wang | G06V 40/1329 |
| 2019/0205596 | A1 | 7/2019 | Kim et al. | |
| 2020/0134278 | A1* | 4/2020 | Lee | G06F 1/1626 |
| 2020/0218877 | A1* | 7/2020 | Yang | G06V 40/1329 |

\* cited by examiner

DISPLAY DEVICE

CROSS-REFERENCE TO RELATED APPLICATION

The present application claims priority under 35 U.S.C. § 119(a) to Korean patent application 10-2020-0076720 filed on Jun. 23, 2020 in the Korean Intellectual Property Office, the disclosure of which is incorporated by reference herein in its entirety.

BACKGROUND

1. Technical Field

The present disclosure generally relates to a display device with a fingerprint sensor.

2. Related Art

Electronic devices such as televisions, mobile phones, computers, tablets, etc. may include a display device (e.g., a display unit, a display panel) to convey visual information to a user such as text information, video information, picture information, two-dimensional or three-dimensional images, or the like. For instance, a display device may include a multitude of light-emitting pixels. A display may be a self-luminescent display panel such as an Organic Light-emitting Display panel (OLED panel), or a non-self-luminescent display panel such as a Liquid Crystal Display panel (LCD panel).

A folding display device provides an ability to bend or fold the display for a more portable electronic device. However, a folding display device may have reduced (e.g., relatively weak) mechanical strength in order to enable such bending and folding of the display. Reduced mechanical strength may result in damage to the display, provide an unusable display device, reduce the efficacy or feasibility of certain features (e.g., such as touchscreen features), etc. Accordingly, improved display devices may be desired.

SUMMARY

Embodiments provide a display device capable of improving the mechanical strength thereof while ensuring sensitivity of a fingerprint sensor.

In accordance with an aspect of the present disclosure, there is provided a display device including: a display panel including a display area; a cover panel disposed on a rear surface of the display panel, wherein the cover panel includes an opening corresponding to a sensing area of the display panel; a fingerprint sensor disposed on the rear surface of the display panel in the opening of the cover panel, wherein the fingerprint sensor includes a sensor layer; and a reinforcing member disposed on a rear surface of the fingerprint sensor, wherein the reinforcing member includes a sidewall surrounding at least one area of the sensor layer and a bottom surface that extends from the sidewall and is spaced apart from the sensor layer.

The sensor layer may include an ultrasonic sensor layer. The cover panel may include a support member disposed on a rear surface of the reinforcing member to support the reinforcing member. The support member may be a plate-shaped member in direct contact with the rear surface of the reinforcing member. The support member may be a metal plate.

The sidewall of the reinforcing member may be disposed on an edge area of the rear surface of the fingerprint sensor and the reinforcing member is spaced apart from the sensor layer at a distance of at least 1 μm. The sidewall of the reinforcing member may surround one or more side surfaces of the sensor layer. The sidewall of the reinforcing member may include at least one opening and at least partially surrounds one or more side surfaces of the sensor layer.

The reinforcing member may be configured with a plurality of sub-reinforcing members that are separated from each other and disposed in a distributed manner on the rear surface of the fingerprint sensor.

A width of the bottom surface of the reinforcing member may have a width less than a width of a base layer of the fingerprint sensor and the bottom surface of the reinforcing member may be disposed in a plane view area in which the fingerprint sensor is disposed. A width of the bottom surface of the reinforcing member may be greater than an area of the sensor layer and the bottom surface of the reinforcing member may be disposed in a plane view area including a sensing area in which the sensor layer is disposed. The bottom surface of the reinforcing member may extend up to a peripheral area of the opening and a width of the bottom surface of the reinforcing member is greater than a width of the opening of the cover panel.

The cover panel may include a support member disposed at a lower end portion of the cover panel and the support member has an opening corresponding to the reinforcing member. The fingerprint sensor may be disposed in the display area when viewed on a plane. A space in which an air gap is formed may be disposed between the sensor layer and the reinforcing member. The display area may include a flexible bending area (e.g., a bending area with flexibility).

In accordance with an aspect of the present disclosure, there is provided a display device including: a display panel including a display area; a cover panel disposed on a rear surface of the display panel, the cover panel including an opening corresponding to a sensing area of the display panel; a fingerprint sensor disposed on the rear surface of the display panel in the opening of the cover panel, wherein the fingerprint sensor includes a sensor layer; and a reinforcing member including a sidewall and a bottom surface, wherein the sidewall is disposed on a rear surface of the fingerprint sensor around the sensor layer and the bottom surface extends from the sidewall forming an air gap between the sensor layer and the bottom surface.

In accordance with an aspect of the present disclosure, there is provided a method of manufacturing a display device including: providing a display panel including a display area; providing a cover panel disposed on a rear surface of the display panel, the cover panel including an opening corresponding to a sensing area of the display panel; providing a fingerprint sensor disposed on the rear surface of the display panel in the opening of the cover panel, wherein the fingerprint sensor includes a sensor layer; and providing a reinforcing member including a sidewall and a bottom surface, wherein the sidewall is disposed on a rear surface of the fingerprint sensor around the sensor layer and the bottom surface extends from the sidewall forming an air gap between the sensor layer and the bottom surface.

BRIEF DESCRIPTION OF THE DRAWINGS

Example embodiments will now be described more fully hereinafter with reference to the accompanying drawings. However, the example embodiments may be embodied in different forms and should not be construed as limited to the embodiments set forth herein. Rather, the example embodiments are provided so the present disclosure will be thorough and complete and will fully convey the scope of the example embodiments to those skilled in the art.

In the drawing figures, dimensions may be exaggerated for clarity of illustration. It will be understood that when an element is referred to as being "between" two elements, the element can be the only element between the two elements, or one or more intervening elements may also be present. Like reference numerals refer to like elements throughout.

DETAILED DESCRIPTION

Figure 1:
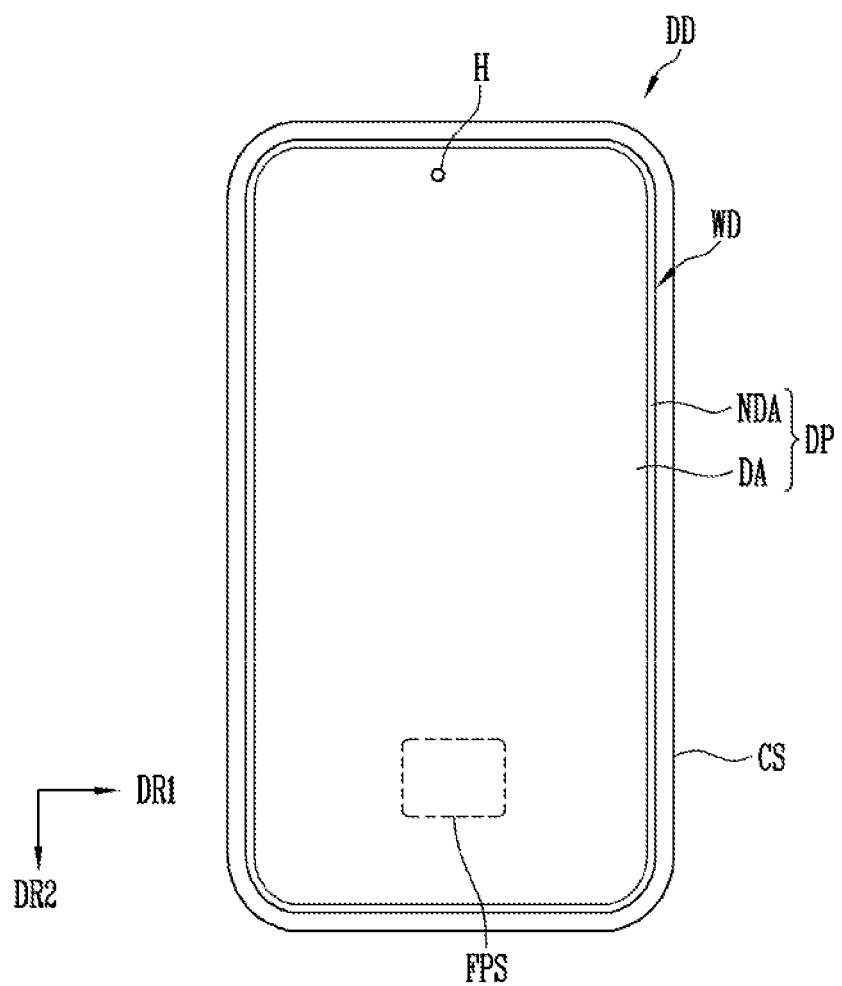
FIG. 1 is a plan view illustrating a display device in accordance with an embodiment of the present disclosure.

Electronic devices such as televisions, mobile phones, computers, tablets, etc. may include a display (e.g., a display unit, a display panel) to convey visual information to a user such as text information, video information, picture information, two-dimensional or three-dimensional images, or the like. Some display devices may be capable of being bent or folded for increase portability. However, a folding display device may have reduced (e.g., relatively weak) mechanical strength in order to enable such bending and folding of the display. Reduced mechanical strength may reduce the efficacy or feasibility of certain features (e.g., such as touch-screen features, fingerprint sensing features), etc.

For instance, a display device may include a touch sensor (e.g., photosensitive type touch sensor, a resistive type touch sensor, and/or a pressure sensitive type touch sensor) disposed on a surface of a display panel to receive touch input from a user. The touch sensor may recognize a touch event from a hand of the user or a separate input means (e.g., such as a stylus). A display device may also include a fingerprint sensor (e.g., a photo sensor, a capacitance sensor, and an ultrasonic sensor). For instance, in some cases, a fingerprint sensor may be used to provide a secure process for a user to access the display device. A fingerprint sensor may recognize a fingerprint of a user by emitting an ultrasonic signal to a finger of the user in contact with the display module and by receiving an intensity of the ultrasonic signal changed according to specific ridges or valleys of the fingerprint of the user.

However, some display devices (e.g., folding display devices) may not effectively integrate touch sensors and fingerprint sensors for supporting features such as touch sensing and fingerprint sensing described above. For example, folding display devices may have relatively weak mechanical properties compared to non-folding display devices. Accordingly, folding display devices may be associated with a higher possibility of damage to the display device if pressure is applied to a display panel. For instance, a pressure exerted on the display device by a user (e.g., for touch screen functionality, for fingerprint sensing functionality, etc.) may damage a display device that is associated with reduced mechanical robustness/rigidity in order to support folding and bending of the display device.

The present disclosure relates generally to a display device with a fingerprint sensor. More particularly, embodiments of the present disclosure provide for a reinforcing member disposed under a fingerprint sensor in a manner capable of strengthening a display device integrating the fingerprint sensor. In some embodiments, the present disclosure strengthens a display device (e.g., a folding display device) and may reduce the possibility of damage to the display device by including a reinforcing member between a fingerprint sensor and a supporting member of the display device.

According to the techniques described herein, a display panel may include a display area, a cover panel, a fingerprint sensor, and a reinforcing member. The cover panel is disposed on a rear surface of the display panel (e.g., a surface opposite a display area) and includes an opening corresponding to a sensing area of the display area of the display panel. The fingerprint sensor is disposed in the opening of the cover panel and includes a sensor layer. The reinforcing member is disposed on a rear surface of the fingerprint sensor. For example, the reinforcing member may include a sidewall surrounding an area of the sensor layer while being in contact with the rear surface of the fingerprint sensor. The reinforcing member may also include a bottom surface which extends from the sidewall and is spaced apart from the sensor layer.

As such, the reinforcing member may be disposed on a rear surface of the fingerprint sensor with the bottom surface of the reinforcing member spaced apart from the rear surface of the fingerprint sensor. Such spacing may form an air gap between the reinforcing member and the fingerprint sensor. Therefore, a space in which the air gap is formed at the rear surface of the fingerprint sensor is secured by the reinforcing member. When the fingerprint sensor is an ultrasonic sensor, the air layer formed under the ultrasonic sensor (e.g., the air gap formed between the reinforcing member and the fingerprint sensor) may reduce interference of the ultrasonic sensor (e.g., and the sensitivity of the ultrasonic fingerprint sensor may be maintained or increased). Accordingly, in a display device, a reinforcing member is provided such that an air layer formed under the fingerprint sensor is secured and the display module is stably supported. Therefore, the mechanical strength of the display device can be increased while ensuring or improving the sensitivity of the fingerprint sensor.

The present disclosure may apply various changes and different shapes. Therefore the present disclosure illustrates details using particular examples. As used herein, the singular forms are intended to include the plural forms as well, unless the context clearly indicates otherwise. The present disclosure is not limited to the embodiments disclosed and may be implemented in various forms. Each embodiment disclosed below may be independently embodied or be combined with at least another embodiment prior to being embodied.

In the following embodiments and the attached drawings, elements not directly related to the present disclosure are omitted from depiction, and dimensional relationships among individual elements in the attached drawings are illustrated only for ease of understanding but not to limit the actual scale. In giving reference numerals to elements of each drawing, like reference numerals refer to like elements even though like elements are shown in different drawings.

FIG. 1 is a plan view illustrating a display device DD in accordance with an embodiment of the present disclosure. FIG. 1 is an example embodiment illustrating the display device DD with a fingerprint sensor FPS.

Referring to FIG. 1, the display device DD may include a display panel DP for displaying an image and a window WD for protecting the display panel DP, and a case CS.

The display panel DP includes a display area DA and a non-display area NDA located at the periphery of the display area DA. The display area DA includes a plurality of pixels for displaying an image. In an embodiment, a light-transmitting hole area H (e.g., a non-pixel area in which any pixel is not disposed or a low-resolution area in which pixels are disposed at a low resolution) corresponding to a camera or the like may be formed in the display area DA, but the present disclosure is not limited thereto. The non-display area NDA may be disposed on at least one side of the display area DA to partially or entirely surround the display area DA. Lines, pads, and/or at least one driving circuit, which are used to drive the pixels of the display area DA, may be disposed in the non-display area NDA.

The window WD and the case CS are coupled to the display panel DP, to protect the display panel DP from an impact applied from the outside. For example, the window WD may be located at a front surface of the display device DD, disposed on the top of the display panel DP. The case CS may be located at a side surface and/or a rear surface of the display device DD to surround a side surface and/or a rear surface of the display panel DP.

The display device DD may include at least one kind of sensor to provide various functions. For example, the display device DD may include the fingerprint sensor for providing a biometric information authentication function. Additionally or alternatively, the display device DD may further include a touch sensor for providing a touch input function.

For example, the display device DD may include the fingerprint sensor FPS provided at the rear surface of the display panel DP overlapping at least one area of the display area. However, the position of the fingerprint sensor FPS may be variously changed in some embodiments. For example, the fingerprint sensor FPS may be provided to overlap with the non-display area NDA.

An area in which the fingerprint sensor FPS is disposed, particularly, an area in which a sensor layer of the fingerprint sensor FPS is disposed may be set as a sensing area capable of sensing a fingerprint (i.e., a fingerprint sensing area). In an embodiment, when the sensing area overlaps with the display area DA, the display area DA may include the sensing area.

In some examples, a display device DD may include or refer to a user interface that may enable a user to interact with a device. In some embodiments, the user interface may include a display screen, or an input device (e.g., remote control device interfaced with the user interface directly or through an input/output (I/O) controller module). In some cases, an I/O controller may be implemented as part of a processor. In some cases, a user may interact with a device via an input/output (IO) controller or via hardware components controlled by an I/O controller. In some cases, a user interface may be a graphical user interface (GUI).

The display device DD may have various shapes. For example, the display device DD may have a rectangular shape in which a lateral length (or width) along a first direction DR1 is smaller than a longitudinal length along a second direction DR2, but the present disclosure is not limited thereto. For example, in another embodiment, the display device DD may have a rectangular shape in which a lateral length is longer than a longitudinal length or a square shape in which a lateral length and a longitudinal length are substantially the same. Additionally or alternatively, the display device DD may be various shapes in addition to the rectangular shape and the square shape. For example, the display device DD various polygonal shapes, various circular shapes, various elliptical shapes, and/or various combinations thereof. The display device DD may have faceted corners or rounded corners.

Figure 2:
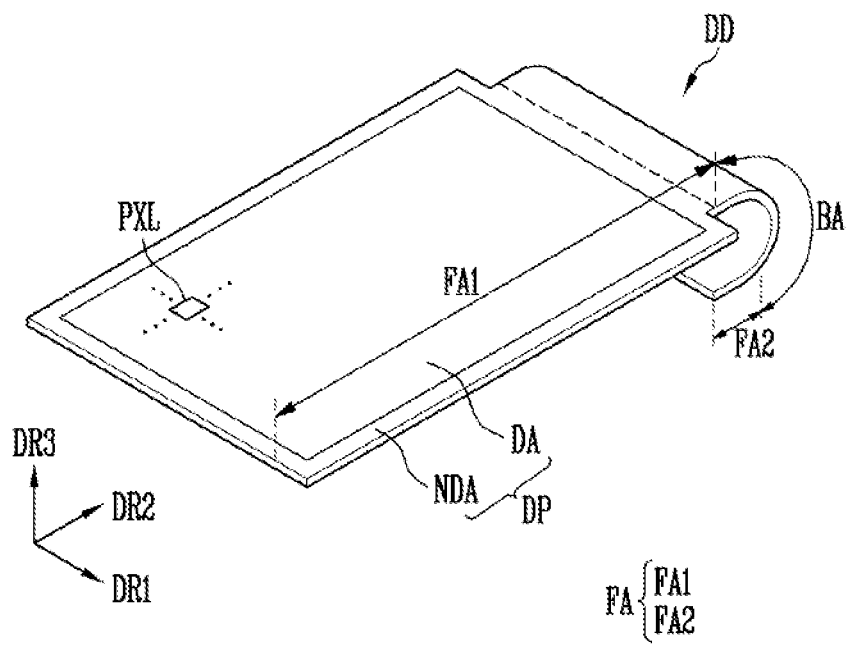
FIGS. 2 and 3 are perspective views each schematically illustrating a display device in accordance with an embodiment of the present disclosure.
Figure 3:
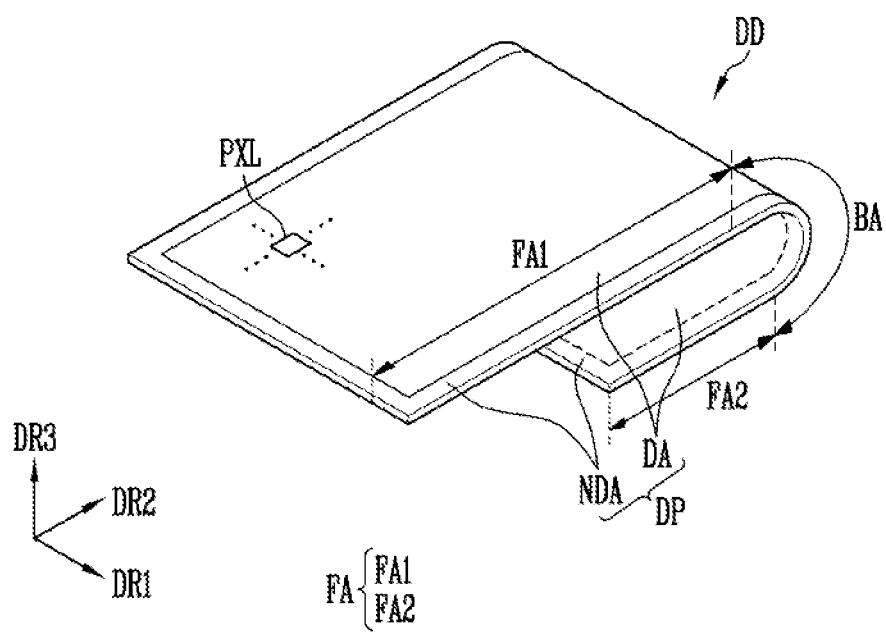

FIGS. 2 and 3 are perspective views each schematically illustrating a display device DD in accordance with an embodiment of the present disclosure. For example, FIGS. 2 and 3 each schematically illustrates a display device DD in accordance with an embodiment, based on a display panel DP.

In some embodiments, FIG. 2 illustrates a display device DD which can be folded or curved in a non-display area NDA in which any pixel is not disposed. FIG. 3 illustrates a display device DD (e.g., a foldable display device) which is foldable or bendable in a display area DA in which pixels PXL are disposed. For convenience, in each of FIGS. 2 and 3, the display device DD with a rectangular shape is disclosed as an example. Additionally or alternatively, an extending direction of short sides is referred to as a first direction DR1, an extending direction of long sides is referred to as a second direction DR2, and a direction perpendicular to a main surface formed by the short sides and the long sides formed by the short sides and the long sides (e.g., a thickness direction of the display device DD) is referred to as a third direction DR3.

Referring to FIGS. 2 and 3, at least one area of the display device DD may have flexibility, and the display device DD may be folded at a portion with the flexibility. In an embodiment, the term "folded" does not mean a fixed shape but may inclusively mean a shape deformable into another shape from the original shape. In the embodiment of the present disclosure, the term "folded" may include a shape folded, curved, or rolled like a roll along at least one specific line, i.e., a folding line.

For example, the display device DD may include a bending area BA (also referred to as a "folding area") with flexibility and a flat area FA, which is continuously flat on at least one side of the bending area BA. The bending area BA has flexibility for bending. The flat area FA may or may not have flexibility.

The flat area FA may include a first flat area FA1 and a second flat area FA2 spaced apart, with the bending area BA interposed therebetween. The first flat area FA1 may be provided in the display area DA and/or at least a portion of the non-display area NDA. The bending area BA may be disposed continuously to the first flat area FA1, and the second flat area FA2 may be disposed continuously to the bending area BA. The bending area BA may be integrally formed with the first flat area FA1 to be continuous to the first flat area FA1, but the present disclosure is not limited thereto.

The bending area BA may be provided in a folded state such that one surface of the first flat area FA1 and one surface of the second flat area FA2 are located in parallel to each other and face each other. However, the present disclosure is not limited thereto. For example, the bending area BA may be folded while the surfaces of the first and second flat areas FA1 and FA2 are forming a predetermined angle (e.g., an acute angle, a right angle and/or an obtuse angle) with the bending area BA interposed therebetween.

In an embodiment, the bending area BA may be provided in the non-display area NDA. For example, as shown in FIG. 2, the non-display area NDA may include a protrusion area protruding along at least one direction (e.g., the second direction DR2) from a portion thereof and be folded or curved in the protrusion area. For example, the first flat area FA1 may be provided in the display area DA and/or in the non-display area NDA at the periphery thereof, and the bending area BA and the second flat area FA2 may be provided in the protrusion area of the non-display area NDA.

The protrusion area of the non-display area NDA may be subsequently folded, bent, and/or rolled along a folding line. Since the protrusion area of the non-display area NDA is folded and/or bent, the width of a bezel can be decreased.

In another embodiment, the bending area BA may be provided in the display area. For example, as shown in FIG. 3, the display device DD may include a bending area BA disposed in the display area DA and may be formed to be folded toward the rear surface and/or the front surface in the bending area BA. Additionally or alternatively, the bending area BA may be defined as a specific area of the display area DA. Alternatively, the bending area BA is not defined as the display area DA but may be formed to be deformable in the whole of the display area DA.

Although the display area DD folded toward the rear surface in the bending area BA (e.g., an out-foldable display device) has been disclosed in FIGS. 2 and 3, the direction in which the display device DD is folded may be changed. For example, the display device DD may be formed to be folded toward the front surface in the bending area BA or to be folded toward both the front surface and rear surface in the bending area BA. Additionally or alternatively, the display device DD may include a plurality of bending areas BA disposed in a specific area (or folding lines defined in each bending area BA), or be formed to be folded in the majority of areas including the display area DA.

Figure 4:
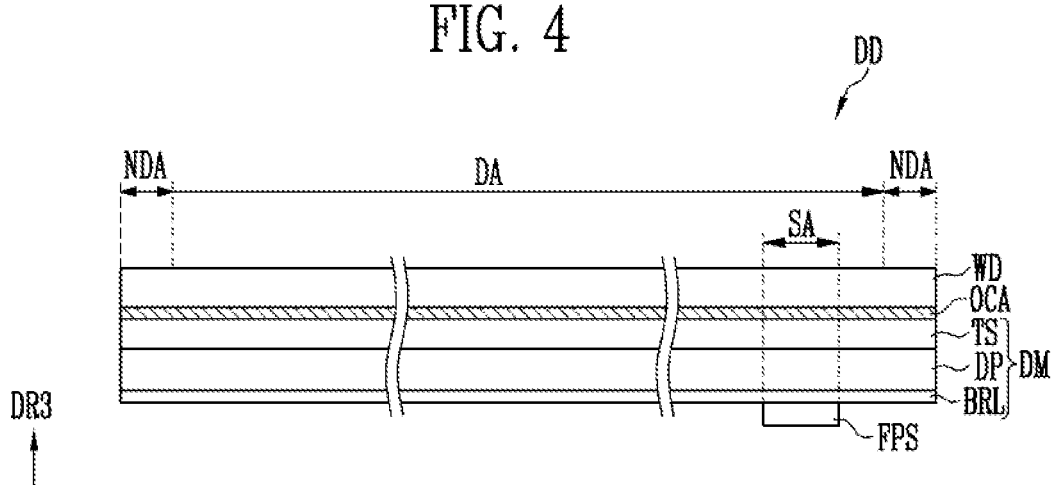
FIG. 4 is a sectional view schematically illustrating a display device in accordance with an embodiment of the present disclosure.

FIG. 4 is a sectional view schematically illustrating a display device DD in accordance with an embodiment of the present disclosure. For example, FIG. 4 schematically illustrates a section of the display device DD with a touch sensor TS and a fingerprint sensor FPS.

Referring to FIG. 4, the display device DD in accordance with the embodiment of the present disclosure may include a display module DM and a window WD.

The display module DM may include a display panel DP and the touch sensor TS.

In an embodiment, the touch sensor TS may be directly disposed on one surface (e.g., an upper surface) of the display panel DP. In the description of the embodiment of the present disclosure, the term "being directly disposed" excludes being attached using a separate adhesive layer, and may mean being directly formed on a partial layer of the display panel DP through a continuous process.

In another embodiment, the touch sensor TS may be manufactured separately from the display panel DP, to be attached on the one surface of the display panel DP by an adhesive layer or the like. The touch sensor TS may be directly attached to the display panel DP, or be attached on the top of the display panel DP with an optical member (e.g., a polarizing film) and/or a protective member (e.g., a protective film), which is interposed therebetween.

The display panel DP displays arbitrary visual information, e.g., a text, a video, a picture, a two-dimensional or three-dimensional image, or the like. Hereinafter, the arbitrary visual information is designated as an "image." In the present disclosure, the kind, structure, and/or shape of the display panel DP are not particularly limited. For example, the display panel DP may be a self-luminescent display panel such as an Organic Light-emitting Display panel (OLED panel), or a non-self-luminescent display panel such as a Liquid Crystal Display panel (LCD panel), an Electro-Phoretic Display panel (EPD panel), or an Electro-Wetting Display panel (EWD panel). When the non-self-luminescent display panel is used as the display panel DP of the display device DD, the display device DD may have a light source unit (e.g., a backlight unit) for supplying light to the display panel DP.

The touch sensor TS may be disposed on the one surface (e.g., a front surface to which an image is emitted) of the display panel DP to receive a touch input of a user. The touch sensor TS may recognize a touch event of the display device DD through a hand of the user, a separate input means, or the like. In an embodiment, the touch sensor TS may be a capacitive type touch sensor, but the present disclosure is not limited thereto. For example, the touch sensor TS may be a photosensitive type touch sensor, a resistive type touch sensor, and/or a pressure sensitive type touch sensor.

The window WD for protecting an exposure surface of the display module DM may be provided on the display module DM. The window WD protects the display module DM from an external impact, and may provide an input surface and/or a display surface to the user. In an embodiment, the window WD may be coupled to the display module DM through an optically clear adhesive (OCA). In another embodiment, the window WD may be integrally formed with the display module WD.

The window WD may be formed to have rigidity or flexibility by using glass, plastic, or the like. Additionally or alternatively, the window WD may have a single- or multi-layered structure. When the window WD has the multi-layered structure, the window WD may be formed through a continuous process or an adhesion process using an adhesive layer.

The display module DM may selectively further include a polarizing layer and/or a protective layer, which is disposed between the touch sensor TS and the display panel DP. The polarizing layer may polarize light emitted from the display panel DP along a polarization axis.

The display device DD may further include the fingerprint sensor FPS. The fingerprint sensor FPS may be a sensing element recognizing a fingerprint of a user.

In the embodiment shown in FIG. 4, the fingerprint sensor FPS is disposed on a rear surface (or lower surface opposite a display area surface) of the display module DM, but the present disclosure is not limited thereto. For example, in another embodiment, the fingerprint sensor FPS may be disposed on a front surface (or upper surface). Although not directly shown in the drawing, the fingerprint sensor FPS may be connected to a fingerprint sensor driver (not shown) through a separate line, a flexible printed circuit board, a tape carrier package, a connector, and/or a chip on film.

The fingerprint sensor FPS may be one of a photo sensor, a capacitance sensor, and an ultrasonic sensor. In some cases, a fingerprint sensor FPS may be used to provide a secure process to access the display device. In some cases, a FPS may include a touch-screen digitizer overlaid onto the display that can sense touch and interact with the display. In an embodiment of the present disclosure, the fingerprint sensor FPS may be an ultrasonic sensor which senses a fingerprint by using an ultrasonic method. Therefore, the fingerprint sensor FPS in accordance with the embodiment of the present disclosure may be referred to as an ultrasonic sensor.

The fingerprint sensor FPS may recognize a fingerprint of a user by emitting an ultrasonic signal to a finger of the user, which is in contact with the display module DM and/or the window WD, and receiving an intensity of the ultrasonic signal changed according to a ridge or valley of the fingerprint formed at the finger of the user.

In description of the embodiment of the present disclosure, an area in which a fingerprint can be sensed by the fingerprint sensor FPS (i.e., an area corresponding to the fingerprint sensor FPS) is referred to as a sensing area SA. In an embodiment, the sensing area SA may be disposed to overlap with the display area DA. For example, when viewed on a plane, the sensing area SA may be disposed at the inside of the display area DA, and the display area DA includes the sensing area SA. However, the positions of the fingerprint sensor FPS and the sensing area SA according thereto may be changed in some embodiments.

Figure 5:
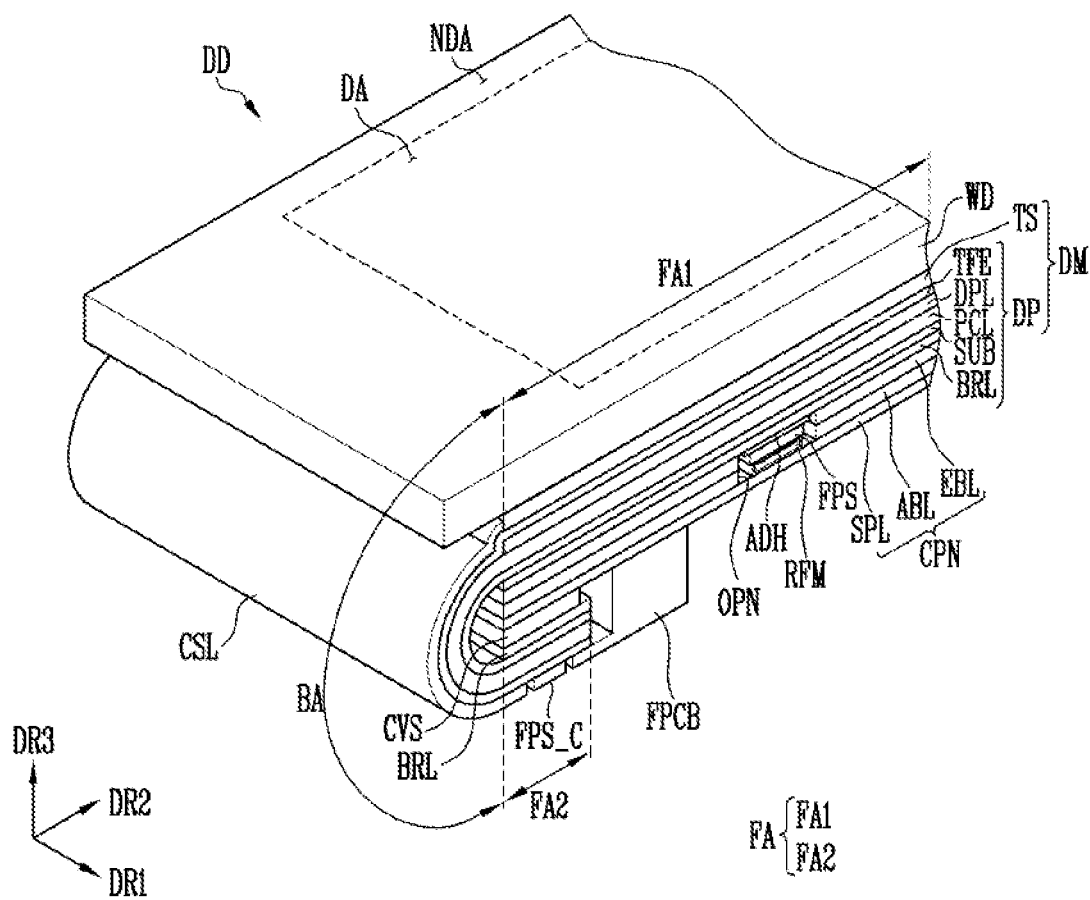
FIG. 5 is a perspective view illustrating in detail one area of a display device in accordance with an embodiment of the present disclosure.
Figure 6:
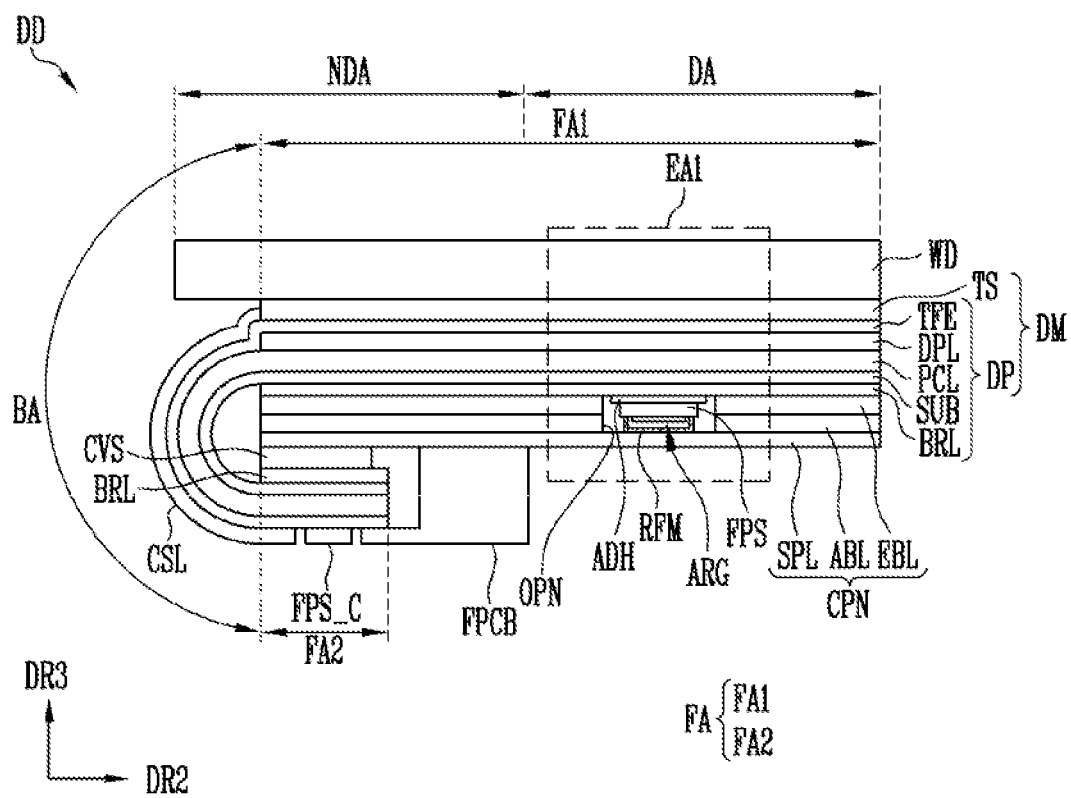
FIG. 6 is a sectional view of the display device shown in FIG. 5.

FIG. 5 is a perspective view illustrating in detail one area of a display device DD in accordance with an embodiment of the present disclosure. FIG. 6 is a sectional view of the display device DD shown in FIG. 5. Although a case where a section of the display device DD in which a bending area BA is provided in a non-display area NDA as shown in FIG. 2 is illustrated in FIGS. 5 and 6, the present disclosure is not limited thereto.

Referring to FIGS. 1 to 6, the display device DD in accordance with the embodiment of the present disclosure includes a display module DM, a window WD, a cover panel CPN, and a fingerprint sensor FPS (or ultrasonic sensor). Additionally or alternatively, the display device DD in accordance with the embodiment of the present disclosure further includes a reinforcing member RFM disposed on the bottom of the fingerprint sensor FPS.

The display device DD may include a display area DA and a non-display area NDA, and include a flat area FA and the bending area BA. The flat area FA and the bending area BA may be set based on a display panel DP. For example, the flat area FA and the bending area BA may be determined according to whether the display panel DP is bent and a position at which the display panel DP is bent.

The flat area FA may include a first flat area FA1 and a second flat area FA2 with the bending area BA interposed therebetween. The second flat area FA2 may face the first flat area FA1 with the bending area BA interposed therebetween, in a state in which the display device DD is bent.

In an embodiment, the first flat area FA1 may correspond to the display area DA and at least a portion of the non-display area NDA. The bending area BA may correspond to the non-display area NDA, and the second flat area FA2 may also correspond to the non-display area NDA. When the bending area BA is provided in the display area as illustrated in the embodiment shown in FIG. 3, the bending area BA may correspond to one area of each of the display area DA and the non-display area NDA, and the flat area FA may correspond to another area of each of the display area DA and the non-display area NDA.

In an embodiment, the window WD may be provided to correspond to the first flat area FA1 and a portion of the bending area BA. A touch sensor TS and a partial configuration of the display panel DP may be provided to correspond to the first flat area FA1, and the other configuration of the display panel DP may be provided to correspond up to the bending area BA and the second flat area FA2. In another embodiment, some or all configurations of the window WD, the touch sensor TS, and the display panel DP may be provided to correspond to the first flat area FA1, the bending area BA, and the second flat area FA2.

The display panel DP may include a substrate SUB, a pixel circuit layer PCL provided on the substrate SUB, a display element layer DPL provided on the pixel circuit layer PCL, and a thin-film encapsulation layer TFE (or upper substrate) covering the display element layer DPL. The display panel DP is assumed to be an organic light-emitting display panel, and the configuration of the display panel DP may be changed when the display panel DP is a display panel with another kind and/or another structure.

In an embodiment, the substrate SUB, the pixel circuit layer PCL, and the thin-film encapsulation layer TFE may be provided to correspond to the first flat area FA1, the bending area BA, and the second flat area FA2, and the display element layer DPL may be provided to correspond to the first flat area FA1. In another embodiment, the thin-film encapsulation layer TFE may be provided to correspond to at least a portion of the bending area BA continued to the first flat area FA1. When the display panel DP is bent, one area of the substrate SUB, which corresponds to the first flat area FA1, may face another area of the substrate SUB, which corresponds to the second flat area FA2.

The display panel DP may further include at least one of a crack prevention layer CSL covering at least a portion of the thin-film encapsulation layer TFE and a protective layer BRL disposed on one surface of the substrate SUB.

The crack prevention layer CSL may be made of a polymer compound, minimize the occurrence of a crack due to stress applied to the substrate SUB when the display panel DP is bent, and block a propagation of the crack. Accordingly, the durability of the display module DM may be increased. The crack prevention layer CSL may be provided to correspond to the bending area BA. Additionally or alternatively, the crack prevention layer CSL may be provided to correspond to at least a portion of the second flat area FA2.

The protective layer BRL may be disposed on the one surface of the substrate SUB. For example, the protective layer BRL may be provided and/or formed on a rear surface of the substrate SUB, on which the pixel circuit layer PCL and the display element layer DPL are not disposed. Although a case where the protective layer BRL is one component of the display panel DP has been illustrated in FIG. 5, the present disclosure is not limited thereto. For example, the protective layer BRL may be considered as a component separately from the display panel DP.

The protective layer BRL may block oxygen, moisture, and the like from being introduced into the display panel DP from the outside, and be provided in the form of a single layer or a multi-layer. In some embodiments, the protective layer BRL may be configured in the form of a film with flexibility. Additionally or alternatively, an adhesive layer (or gluing layer) (not shown) may be formed and/or provided between the substrate SUB and the protective layer BRL, and accordingly, the substrate SUB and the protective layer BRL can be firmly coupled to each other.

The protective layer BRL may be provided to correspond to the first flat area FA1 and the second flat area FA2. Hereinafter, for convenience, the protective layer BRL corresponding to the first flat area FA1 is designated as a first protective layer BRL, and the protective layer BRL corresponding to the second flat area FA2 is designated as a second protective layer BRL.

The first protective layer BRL and the second protective layer BRL may be separated from each other with the bending area BA interposed therebetween. The first protective layer BRL and the second protective layer BRL may face each other when the display panel DP is bent. In an embodiment, the protective layer BRL may not be provided in the bending area BA so as to minimize stress generated when the display panel DP is bent, but the present disclosure is not limited thereto. For example, in another embodiment, the protective layer BRL may be provided even in the bending area BA.

A flexible circuit board FPCB may be attached to the display panel DP at one side of the display panel DP. Components such as the flexible circuit board FPCB, which maximize space efficiency and may not be viewed by a user, may be disposed to face a lower surface of the display module DM, e.g., a surface on which an image is not displayed when the display panel DP is bent. Although a case where the flexible circuit board FPCB is attached to the thin-film encapsulation layer TFE has been illustrated for convenience, the flexible circuit board FPCB may be attached to any one of the components included in the display panel DP to be electrically connected to a driving circuit (D-IC) of the display panel DP.

A fingerprint sensor driver FPS_C for driving the fingerprint sensor FPS may be disposed between the flexible circuit board FPCB and the crack prevention layer CSL. Although a case where the fingerprint sensor driver FPS_C is disposed separately from the flexible circuit board FPCB on the display panel DP has been illustrated in FIGS. 5 and 6, the present disclosure is not limited thereto. For example, in another embodiment, the fingerprint sensor driver FPS_C may be mounted on the flexible circuit board FPCB.

The cover panel CPN may be disposed on a rear surface of the display panel DP, i.e., a surface on which an image is not displayed. For example, the cover panel CPN may be disposed on a rear surface of the protective layer BRL. In an embodiment, an adhesive layer (or gluing layer) may be interposed between the protective layer BRL and the cover panel CPN. The cover panel CPN may protect the display module DM from an external impact or the like.

The cover panel CPN may include a cushion layer which functions to reduce an external impact and includes an elastically deformable material. For example, the cover panel CPN may include a single-layered or multi-layered cushion layer with at least one of a material such as a thermoplastic elastomer, polystyrene, polyolefin, polyurethane thermoplastic elastomer, polyamide, synthetic rubber, polydimethylsiloxane, polybutadiene, polyisobutylene, poly(styrene-butadiene-styrene), polyurethane, polychloroprene, polyethylene, silicon, and combinations thereof. Additionally or alternatively, the cover panel CPN may be formed of a suitable material within a range in which image display of the display panel DP is not influenced among materials with elasticity.

Additionally or alternatively, the cover panel CPN may further include a high-strength plate (e.g., a metal plate), graphite, a copperplate, and/or a heat radiation plate, which are used to stably support the display module DM at a rear surface of the display module DM.

For example, the cover panel CPN may include an embossed layer EBL, an absorbing layer ABL, and a support member SPL. However, the configuration of the cover channel CPN is not limited thereto, and the cover channel CPN may further include an additional component with various functions.

The relative position (e.g., a stacked order) between the components constituting the cover panel CPN may be variously changed in some embodiments. For example, in the embodiment shown in FIGS. 5 and 6, the embossed layer EBL, the absorbing layer ABL, and the support member SPL are sequentially disposed on the rear surface of the display panel DP. However, in another embodiment, the support member SPL may be first disposed on the rear surface of the display panel DP, and the embossed layer EBL and/or the absorbing layer ABL may be disposed on a read surface of the support member SPL.

The embossed layer EBL may include a plurality of embossed patterns (not shown) which reduce and disperse an external impact or the like and be provided as a single layer or a multi-layer. The absorbing layer ABL may absorb an external impact or the like by filling air therein or by a dispersible material or a sound-absorbing material therein, and be provided as a single layer or a multi-layer. The embossed layer EBL and the absorbing layer ABL may be formed in a form in which the embossed layer EBL and the absorbing layer ABL are separated from each other as shown in the drawings, to be coupled to each other through an adhesive or a gluing agent, but the present disclosure is not limited thereto. For example, the embossed layer EBL and the absorbing layer ABL may be formed as a single layer.

The support member SPL is disposed at a lower end portion of the cover panel CPN, and may be disposed on a rear surface of the reinforcing member RFM disposed in an opening OPN of the cover panel CPN. Accordingly, the support member SPL can support the reinforcing member RFM. For example, the support member SPL may be formed as a plate-shaped member in direct contact with the rear surface of the reinforcing member RFM, to support the reinforcing member RFM on the bottom of the reinforcing member RFM.

The support member SPL may be made of a high-strength and/or high-ductility material to ensure or increase the mechanical strength of the display device DD. For example, the support member SPL may be a metal plate with at least one kind of metal or alloy. Additionally or alternatively, the support member SPL may have a thickness in a range of 10 µm to a few hundreds of µm to have sufficient strength. Accordingly, the mechanical strength of the display device DD can be ensured or increased.

Other components (e.g., the embossed layer EBL and the absorbing layer ABL) of the cover panel CPN, the reinforcing member RFM, the display module DM, and/or the window WD, which are disposed on the top of the support member SPL, can be stably supported by the support member SPL. Accordingly, the mechanical strength of the display device DD can be ensured or increased.

In an embodiment, the shape, material, and size (e.g., area and/or thickness) of the support member SPL may be variously changed according to a design condition of the display device DD, etc. For example, the shape, material, and size of the support member SPL may be determined by synthetically considering the shape, thickness, weight, flexibility, and/or mechanical strength of the display device DD.

In some embodiments, the support member SPL may be attached to a rear surface of the absorbing layer ABL and/or the reinforcing member RFM by an adhesive (or gluing agent), but the present disclosure is not limited thereto. For example, the support member SPL may be coupled to the absorbing layer ABL and/or the reinforcing member RFM by an insertion structure.

In an embodiment, the supporting member SPL may be integrally provided with the heat radiation plate. For example, the support member SPL may be formed of a material capable of radiating heat generated from heat-generating members disposed in the display device DD, to provide a heat radiation function and to stably support the rear surface of the display module DM.

The support member SPL may include a material with a high thermal conductivity so as to exhibit a high heat radiation characteristic. For example, the support member SPL may include an organic material with a high thermal conductivity, such as carbon (graphite), or a metal. In some embodiments, a plurality of through-holes may be formed in the supporting member SPL so as to secure a high heat radiation characteristic.

The support member SPL is configured with the heat radiation plate, so heat generated from the heat-generating members adjacent to the support member SPL can be radiated when the display device DD is driven. Accordingly, the stability of driving can be ensured even when the display device DD is continuously driven.

In an embodiment, the flexible circuit board FPCB may be connected to the support member SPL while facing the lower surface of the display module DM when the display module DP is bent. Accordingly, heat generated from the flexible circuit board FPCB is radiated through the support member SPL, so the flexible circuit board FPCB can be stably driven.

The support member SPL may be integrally provided with the heat radiation plate, however the present disclosure is not limited thereto. For example, in another embodiment, the cover panel CPN may include a heat radiation plate provided separately from the support member SPL. For example, the cover panel CPN may include the heat radiation plate in addition to the support member SPL. The support member SPL may be designed by further emphasizing the mechanical strength and/or flexibility of the display device DD.

The first protective layer BRL may be provided and/or formed on one area of the cover panel CPN (e.g., an area corresponding to the first flat area FA1). Additionally or alternatively, the second protective layer BRL may be provided and/or formed on another area of the cover panel CPN (e.g., an area corresponding to the second flat area FA2) with a cover spacer CVS interposed therebetween.

The cover spacer CVS may control a bending (or curving) degree of the display panel DP by uniformly maintaining a distance between the cover panel CPN and one area of the display panel DP, which corresponds to the second flat area FA2, when the display panel DP is bent. Additionally or alternatively, when the display panel DP is bent, the cover spacer CVS may support the one area of the display panel DP, which corresponds to the second flat area FA2, when the first flat area FA1 and the second flat area FA2 face each other. In an embodiment, the cover spacer CVS may include the same material as the cover panel CPN, but the present disclosure is not limited thereto. For example, the cover spacer CVS may include an elastic material suitable for a design condition of the display panel DP, etc.

The cover panel CPN may include the opening OPN corresponding to one area of the display panel DP. For example, the cover panel CPN may include the opening OPN formed in at least some components (e.g., the embossed layer EBL and the absorbing layer ABL) at a position corresponding to the sensing area SA. The fingerprint sensor FPS may be disposed in the opening OPN of the cover panel CPN.

The opening OPN of the cover panel CPN may be formed in an area including the sensing area SA in which the fingerprint sensor FPS is to be disposed while with an area greater than an area of the fingerprint sensor FPS. For example, the opening OPN of the cover panel CPN may have a width greater than a width of the fingerprint sensor FPS in each of the first direction DR1 and the second direction DR2. Additionally or alternatively, the cover panel CPN may have a thickness equal to or greater than a thickness of the fingerprint sensor FPS (e.g., or a thickness, t1, of a sensor layer SSL). Accordingly, the cover panel CPN may be disposed to surround a side surface of the fingerprint sensor FPS.

The fingerprint sensor FPS may be disposed on the rear surface of the display panel DP (or the rear surface of the display module DM including the display panel DP) to be disposed in the opening OPN of the cover panel CPN. For example, the fingerprint sensor FPS may be disposed on the rear surface of the protective layer BRL, which is exposed by the opening OPN, and be attached to the protective layer BRL by an adhesive member ADH.

The adhesive member ADH may be located in the opening OPN of the cover panel CPN, and provides the fingerprint sensor FPS the ability to be stably fixed and/or attached to the display panel DP. For example, the adhesive member ADH may be provided and/or formed between the fingerprint sensor FPS and the rear surface of the protective layer BRL, and provides the fingerprint sensor FPS the ability to be attached to the rear surface (or lower surface) of the protective layer BRL when the fingerprint sensor FPS is inserted into the opening OPN of the cover panel CPN.

In an embodiment, the fingerprint sensor FPS may be an ultrasonic sensor that detects a fingerprint of a user by using an ultrasonic wave. For example, the fingerprint sensor FPS may transmit an ultrasonic signal in an upper direction of the display device DD (e.g., the third direction toward the display module DM and the window WD from the fingerprint sensor FPS), and receive the ultrasonic signal reflected by the fingerprint of a finger in contact with or close to the window WD on the display device DD, thereby detecting the fingerprint of the user.

When the fingerprint sensor FPS is inserted into the opening OPN of the cover panel CPN, a distance between the finger of the user and the fingerprint sensor FPS may decrease. Accordingly, ultrasonic receiving efficiency is increased. Therefore, the sensing capability of the fingerprint sensor FPS can be increased.

Additionally or alternatively, when the fingerprint sensor FPS is provided in a form in which the fingerprint sensor FPS is inserted (or buried) into the opening OPN of the cover panel CPN, the fingerprint sensor FPS can be disposed at a lower portion of the display module DM without any change in the structure of the display module DM. Accordingly, the fingerprint of the user can be sensed without with any influence on the size of a bezel of the display module DM.

A single fingerprint sensor FPS may be inserted into the opening OPN of the cover panel CPN, or a plurality of fingerprint sensors FPS may be inserted into the opening OPN of the cover panel CPN. When the plurality of fingerprint sensors FPS is inserted into the opening OPN of the cover panel CPN, an image acquired from at least one fingerprint sensor FPS may be synthesized, thereby detecting the fingerprint of the user.

The reinforcing member RFM may be disposed on a rear surface of the fingerprint sensor FPS, to form an air gap ARG between the reinforcing member RFM and the fingerprint sensor FPS. As a result, the reinforcing member RFM may include a bottom surface spaced apart from the rear surface of the fingerprint sensor FPS (e.g., a rear surface of a sensor layer provided in the fingerprint sensor FPS). Therefore, a space in which the air gap ARG can be formed at the rear surface of the fingerprint sensor FPS can be secured by the reinforcing member RFM.

When the fingerprint sensor FPS is an ultrasonic sensor, an air layer may be formed under the ultrasonic sensor, when the air gap ARG is formed under the fingerprint sensor FPS. Accordingly, interference of an ultrasonic sensor can be prevented, and the sensitivity of the fingerprint sensor FPS can be ensured or increased.

In the display device DD in accordance with the above-described embodiment, the fingerprint sensor FPS is configured as an ultrasonic sensor. Further, in the display device DD, the reinforcing member RFM is provided so the air gap ARG through which the air layer can be formed under the fingerprint sensor FPS can be secured, and the display module DM can be stably supported. Accordingly, the mechanical strength of the display device DD can be increased while ensuring or improving the sensitivity of the fingerprint sensor FPS. Therefore, in accordance with the embodiment of the present disclosure, the sensitivity of the fingerprint sensor FPS can be increased and a sufficient mechanical strength can be secured even in a foldable display device (e.g., the display device DD in accordance with the embodiment shown in FIG. 3) with a relatively weak mechanical strength.

For instance, the techniques described herein may be implemented in haptic feedback systems that interact with a user's sense of touch by applying mechanical forces, vibrations, or motions. Haptic stimulation can be used to create or interact with virtual objects in a computer simulation, and to enhance the remote control of machines and devices. Haptic devices may incorporate tactile sensors that measure forces exerted by the user on the interface. According to the techniques described herein, such devices may incorporate sensors (e.g., fingerprint sensors FPS, sensor layers SSL, etc.) on flexible or bendable display areas.

Figure 7:
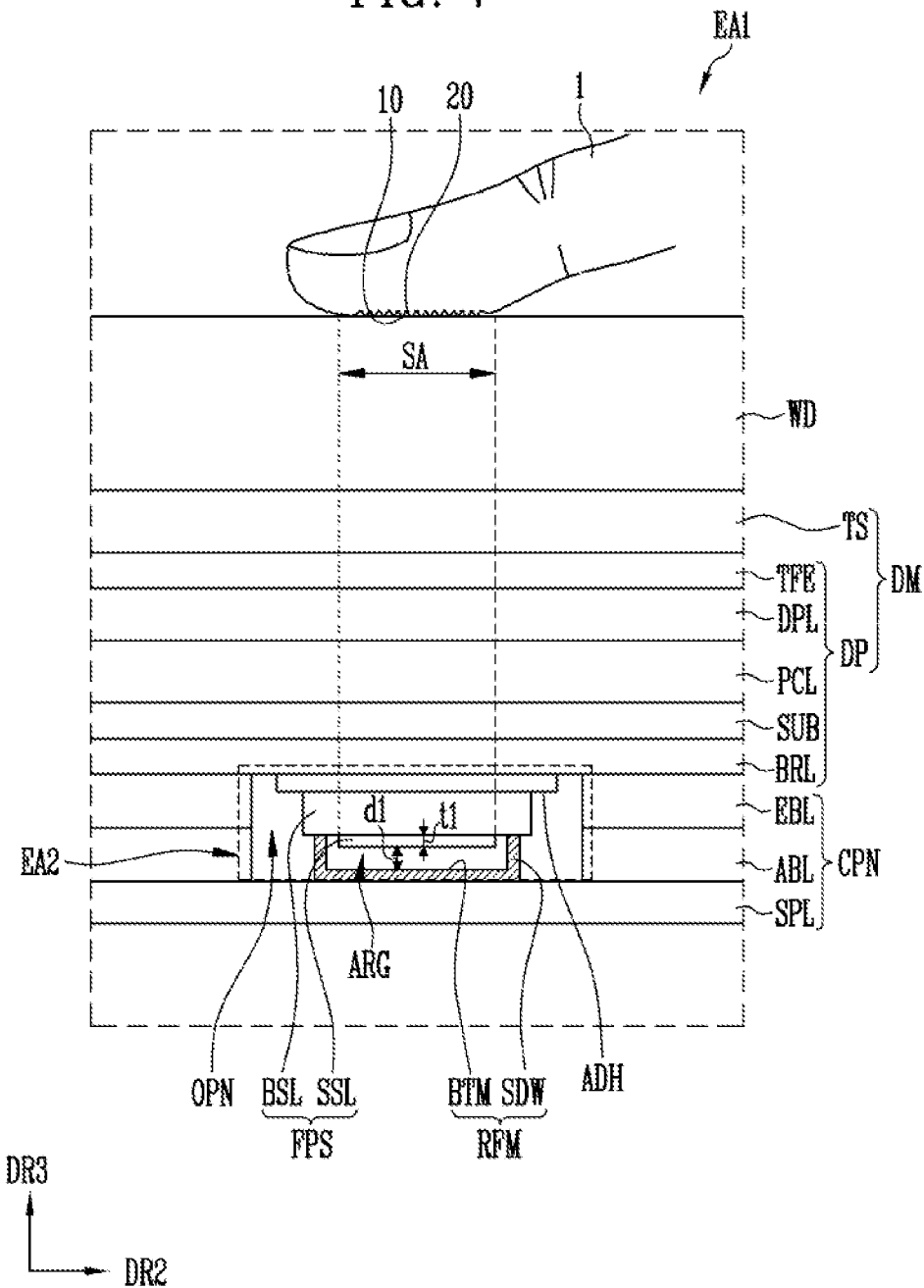
FIG. 7 is an enlarged sectional view illustrating area EA1 shown in FIG. 6.

FIG. 7 is an enlarged sectional view illustrating area EA1 shown in FIG. 6. A finger 1 in contact with a sensing area SA corresponding to the fingerprint sensor FPS will be illustrated together with the fingerprint sensor FPS in FIG. 7 To describe a fingerprint sensing method of the fingerprint sensor FPS in accordance with an embodiment of the present disclosure.

Figure 8:
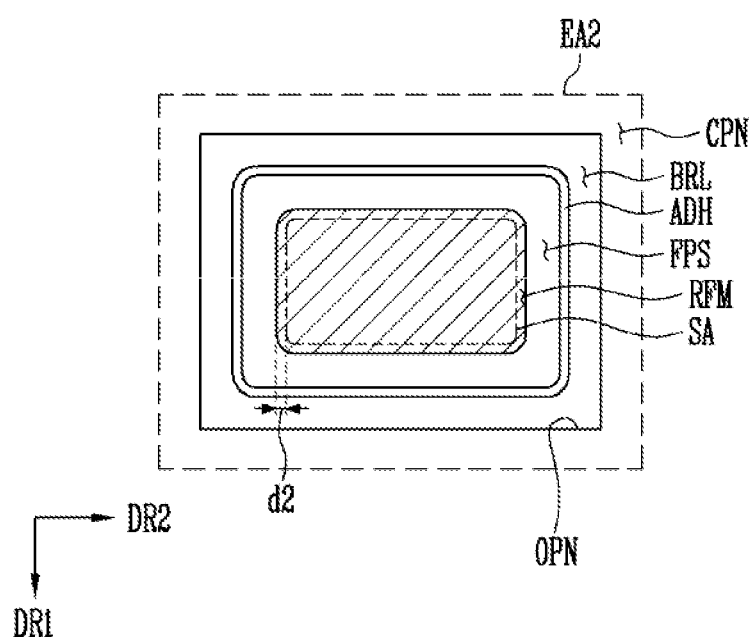
FIG. 8 is a plan view illustrating area EA2 shown in FIG. 7.

FIG. 8 is a plan view illustrating area EA2 shown in FIG. 7. The reinforcing member RFM, and the like, a plan view when the area EA2 shown in FIG. 7 is viewed from a rear direction will be schematically illustrated in FIG. 8 to show a position relationship of the fingerprint sensor FPS.

Figure 9A:
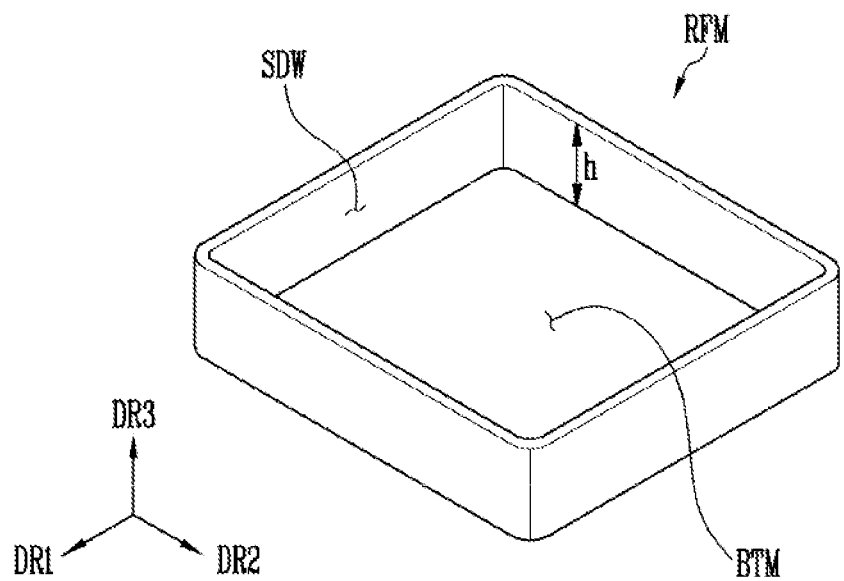
FIGS. 9A and 9B are perspective views each illustrating a reinforcing member in accordance with an embodiment of the present disclosure.
Figure 9B:
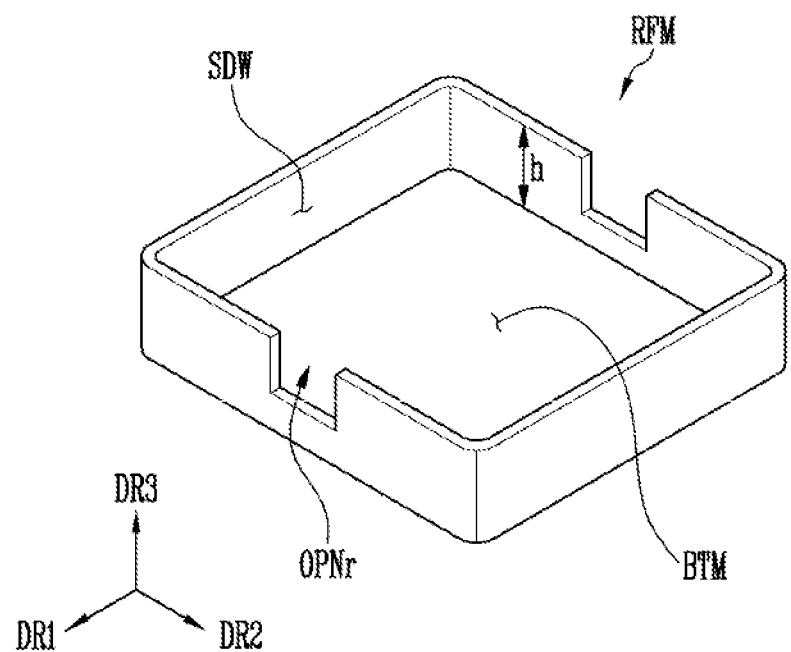

FIGS. 9A and 9B are perspective views illustrating a reinforcing member RFM in accordance with an embodiment of the present disclosure. For example, FIGS. 9A and 9B illustrate different embodiments of the reinforcing member RFM shown in FIGS. 7 and 8.

Referring to FIGS. 7 to 9B, the fingerprint sensor FPS includes a base layer BSL and sensor layer SSL. The sensor layer SSL may be disposed on one surface of the base layer SSL. For example, the sensor layer SSL may be provided on the other surface facing one surface of the base layer BSL, which is attached to the display module DM by the adhesive member ADH. An area in which the sensor layer SSL is disposed may be an active area of the fingerprint sensor FPS, i.e., the sensing area SA. When the finger 1 is in contact with (or close to) the sensing area SA, the fingerprint sensor FPS may detect the shape of fingerprint formed at the finger 1 by using an ultrasonic signal. For example, the fingerprint sensor FPS may detect the fingerprint of the user by analyzing intensities of ultrasonic signals reflected from a ridge 10 and a valley 20 of the fingerprint formed at the finger 1.

In some examples, the fingerprint sensor FPS may be coupled with a processor which may analyze collected ultrasonic signals reflected form the fingerprint of a user. For instance, A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to execute computer-readable instructions stored in a memory to perform various functions (e.g., such as analyze reflected ultrasonic signals, compare fingerprints, perform device unlocking operations, etc.). In some embodiments, a processor includes special purpose components for modem processing, baseband processing, digital signal processing, or transmission processing.

The sensor layer SSL may include an ultrasonic sensor layer. For example, the sensor layer SSL may include a plurality of piezoelectric sensors (not shown) which are densely disposed and a polymer (not shown) disposed between the piezoelectric sensors to insulate vibrations between the piezoelectric sensors. The piezoelectric sensors are electrically connected to the fingerprint sensor driver FPS_C, and the fingerprint sensor driver FPS_C applies an alternating current (AC) voltage with a predetermined frequency to each piezoelectric sensor. An ultrasonic signal with a predetermined resonant frequency may be emitted to the fingerprint sensor FPS while the piezoelectric sensor is vibrated by the AC voltage.

When any object is not in contact with the window WD on the window WD, a majority of ultrasonic signals do not pass through an upper surface (or contact surface) of the window WD but is reflected and then returned due to a medium difference between the window WD and air. Additionally or alternatively, the finger 1 of the user is in contact with the window WD on the window WD, some of the ultrasonic signals in direct contact with the valley 20 of the fingerprint pass through an interface between the window WD and the fingerprint, and some of the ultrasonic signals generated by the piezoelectric sensor is reflected and then returned. The fingerprint sensor driver FPS_C may detect the fingerprint of the finger 1 by measuring intensities of the ultrasonic signals which are reflected and then returned.

In an embodiment of the present disclosure, the reinforcing member RFM is disposed under the fingerprint sensor FPS. The reinforcing member RFM may be disposed on the rear surface of the fingerprint sensor FPS to surround at least one area of the sensor layer SSL.

The reinforcing member RFM may include a sidewall SDW surrounding at least one area of the sensor layer SSL while being in contact with the rear surface of the fingerprint sensor FPS and a bottom surface BTM extending from the sidewall SDW. The bottom surface BTM of the reinforcing member RFM may be spaced apart from the rear surface of the fingerprint sensor FPS (e.g., a rear surface of the sensor layer SSL), and accordingly, an air layer may be formed under the fingerprint sensor FPS.

For example, the reinforcing member RFM may include the bottom surface BTM spaced apart from the sensor layer SSL at a first distance d1 (e.g., a vertical distance along the third direction DR3), and the sidewall SDW extending a thickness direction (e.g., the third direction DR3) of the display panel DP to be in contact with an edge of the rear surface of the fingerprint sensor FPS.

The bottom surface BTM of the reinforcing member RFM may have an area wider than an area of the sensor layer SSL, to cover the sensing area SA in which the sensor layer SSL is formed. For example, the bottom surface BTM of the reinforcing member RFM may have a width wider than a width of the sensor layer SSL in each of the first direction DR1 and the second direction DR2. For example, the bottom surface BTM of the reinforcing member RFM may be disposed in an area including the sensing area SA in which the sensor layer SSL is disposed, when viewed on a plane (e.g., when the reinforcing member RFM is viewed from the top or the bottom of the display device DD).

The sidewall SDW of the reinforcing member RFM may be spaced apart from the sensor layer SSL at a second distance d2 (e.g., a horizontal distance along the second direction DR2), to surround a side surface of the sensor layer SSL. In an embodiment, the sidewall SDW of the reinforcing member RFM may be formed in a closed type, as shown in FIG. 9A, to surround the side surface of the sensor layer SSL. In an embodiment, the sidewall SDW of the reinforcing member RFM may be formed in an open type with at least one opening OPNr, as shown in FIG. 9B, to partially surround the side surface of the sensor layer SSL. For example, the sidewall SDW of the reinforcing member RFM may be an open-type or closed-type sidewall. Additionally, the bottom surface BTM of the reinforcing member RFM may include at least one opening or may not include any opening.

Accordingly, a space in which the air gap ARG is formed may be disposed between the sensor layer SSL of the fingerprint sensor FPS and the reinforcing member RFM (e.g., as the reinforcing member RFM may be spaced apart from the sensor layer SSL). An air layer may be formed in the space. Accordingly, the sensitivity of the fingerprint sensor FPS can be increased, and the sensor layer SSL can be protected.

The shape, size, and/or position of the reinforcing member RFM may be changed according to a design condition (e.g., a mechanical strength, thickness, and the like) of the display device, a size of the air gap ARG, which is to be secured to affect the fingerprint sensor FPS, and the like. For example, the distance between the sensor layer SSL and the reinforcing member RFM (e.g., the first distance d1 between the bottom surface BTM of the reinforcing member RFM and the sensor layer SSL and/or the second distance d2 between the sidewall SDW of the reinforcing member RFM and the sensor layer SSL) may be adjusted according to a size of the air gap ARG, which is to be secured at the periphery (e.g., the rear surface) of the sensor layer SSL.

For example, the first distance d1 between the bottom surface BTM of the reinforcing member RFM and the sensor layer SSL may be set in a range of a few hundreds of μm or less, by considering a size of a space which can be formed in the display device DD and a thickness of the air layer, which is to be secured. Additionally or alternatively, the second distance d2 between the sidewall SDW of the reinforcing member RFM and the sensor layer SSL may be set to 1 μm or more, by considering a width of an outer area of the base layer BSL of the fingerprint sensor FPS (e.g., an edge area surrounding the sensing area SA), to which the sidewall SDW of the reinforcing member RFM can be attached or coupled, and a stable separation between the sidewall SDW of the reinforcing member RFM and the sensor layer SSL. For example, the second distance d2 may be set in a range of 1 μm to 10 μm. For example, the reinforcing member RFM may have a size equal to or greater than a size of the sensor layer SSL, and the reinforcing member RFM may have a set size within a range based on the design condition of the display device DD.

In an embodiment, the reinforcing member RFM may have a closed-type or open-type cap shape attached or coupled to an edge of the base layer BSL of the fingerprint sensor FPS to cover the sensor layer SSL. For example, the bottom surface BTM of the reinforcing member RFM has an area wider than an area of the sensor layer SSL of the fingerprint sensor FPS and may have an area narrower than an area of the base layer of the fingerprint sensor FPS. For example, the bottom surface BTM of the reinforcing member RFM has a width narrower than a width of the base layer BSL of the fingerprint sensor FPS in each of the first direction DR1 and the second direction DR1, and may be disposed in an area in which the fingerprint sensor (particularly, the base layer BSL of the fingerprint sensor) is disposed when viewed on a plane. Additionally or alternatively, an upper-end area of the sidewall SDW of the reinforcing member RFM may be in contact with and/or attached to an edge of the rear surface of the base layer BSL (e.g., the one surface on which the sensor layer SSL is formed).

Additionally or alternatively, the shape, size, and/or position of the reinforcing member RFM may be variously changed. For example, the reinforcing member RFM may be formed as illustrated in embodiments shown in FIGS. 10 to 15.

Figure 10:
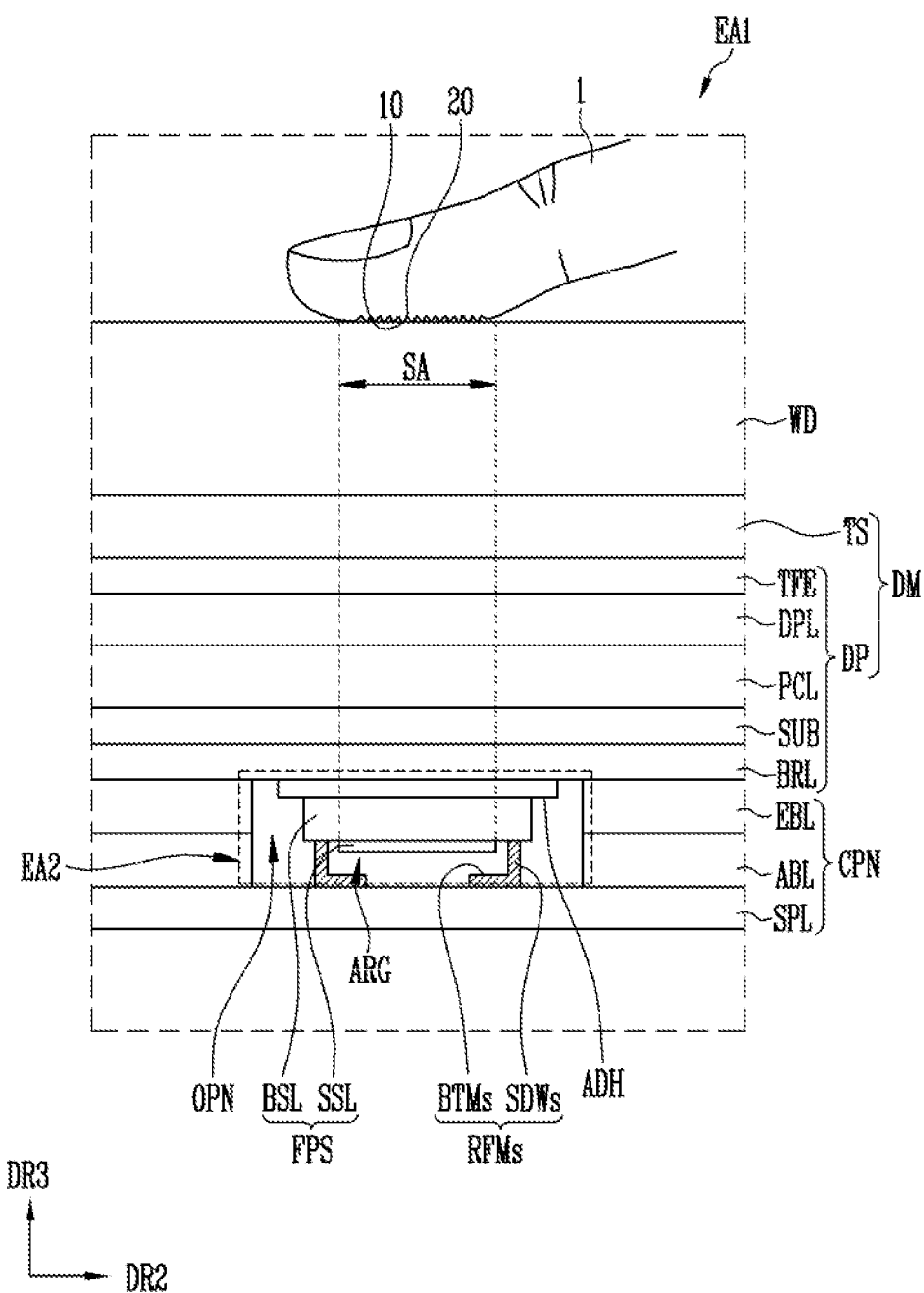
FIG. 10 is an enlarged sectional view illustrating another embodiment of the area EA1 shown in FIG. 6.
Figure 11:
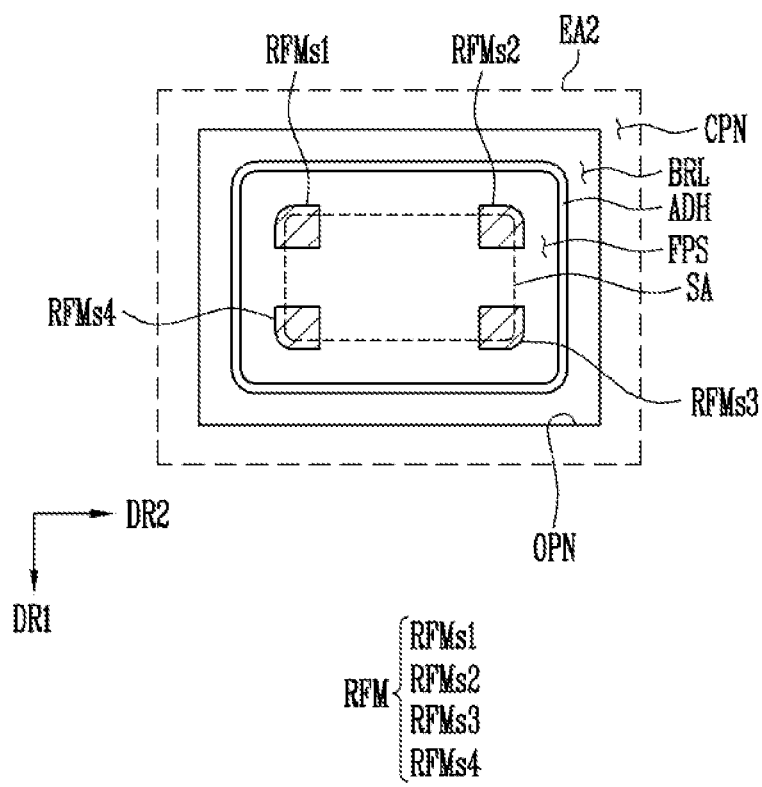
FIG. 11 is a plan view illustrating area EA2 shown in FIG. 10.

FIG. 10 is an enlarged sectional view illustrating another embodiment of the area EA1 shown in FIG. 6. FIG. 11 is a plan view illustrating area EA2 shown in FIG. 10. For example, FIGS. 10 and 11 illustrate a modification of the embodiment shown in FIGS. 7 and 8, and particularly, illustrate a modification of the reinforcing member RFM. In the embodiment shown in FIGS. 10 and 11, detailed descriptions of components similar or identical to those of the above-described embodiment (e.g., the embodiment shown in FIGS. 7 and 8) will be omitted.

Referring to FIGS. 10 and 11, the reinforcing member RFM, a plurality of sub-reinforcing members RFMs which are separated from each other, and the sub-reinforcing members RFMs may be distributed and disposed on the rear surface of the fingerprint sensor FPS. For example, the reinforcing member RFM may include first to fourth sub-reinforcing members RFMs1 to RFMs4 respectively disposed in corner areas on the rear surface of the fingerprint sensor FPS.

Each of the sub-reinforcing members RFMs may include a bottom surface BTMs and a sidewall SDWs, and be disposed to be spaced apart from each other. For example, in some embodiments, the reinforcing member RFM may be configured in a detachable type. The shape, size, and the like of the reinforcing member RFM may be variously changed in some embodiments.

Figure 12:
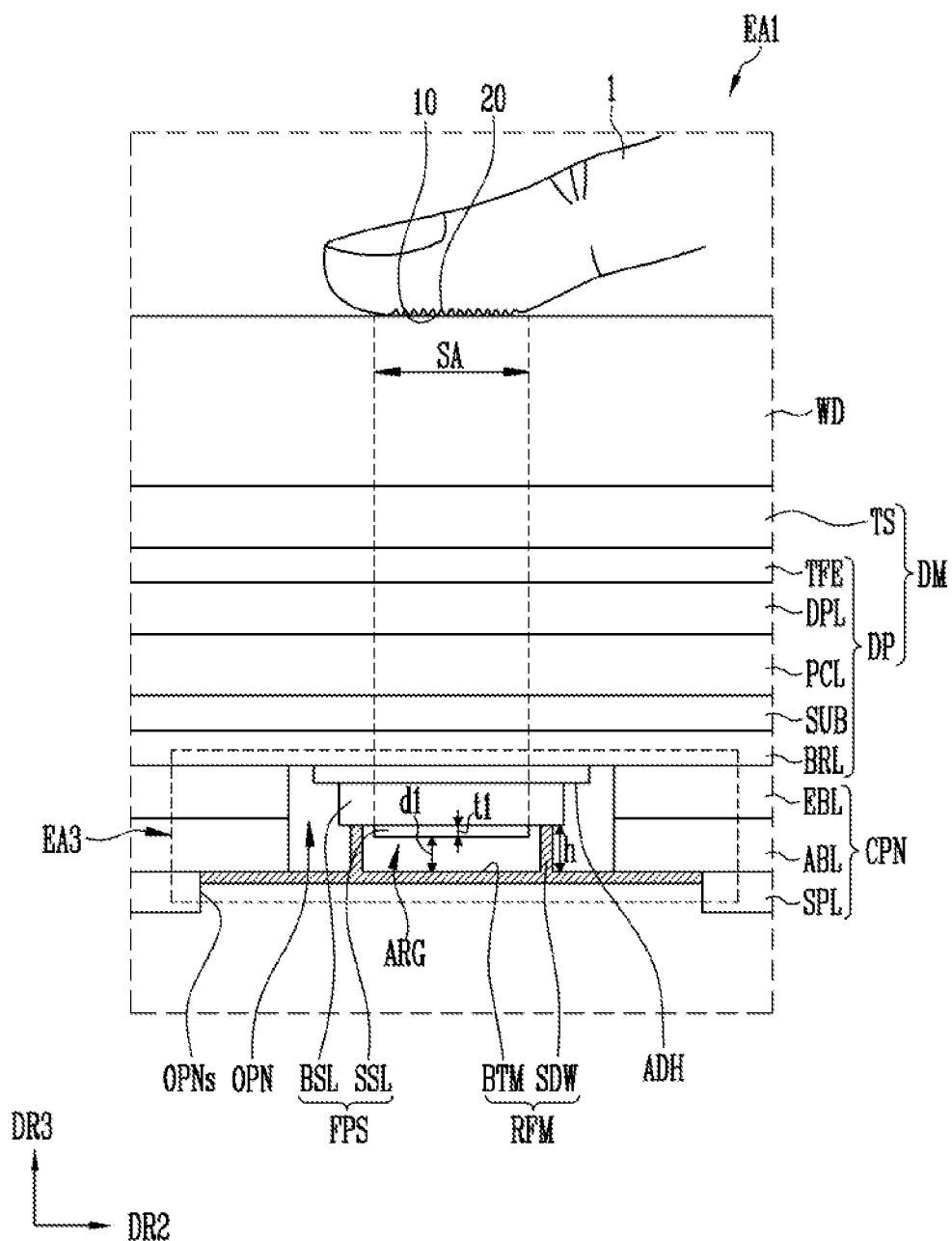
FIG. 12 is an enlarged sectional view illustrating still another embodiment of the area EA1 shown in FIG. 6.
Figure 13:
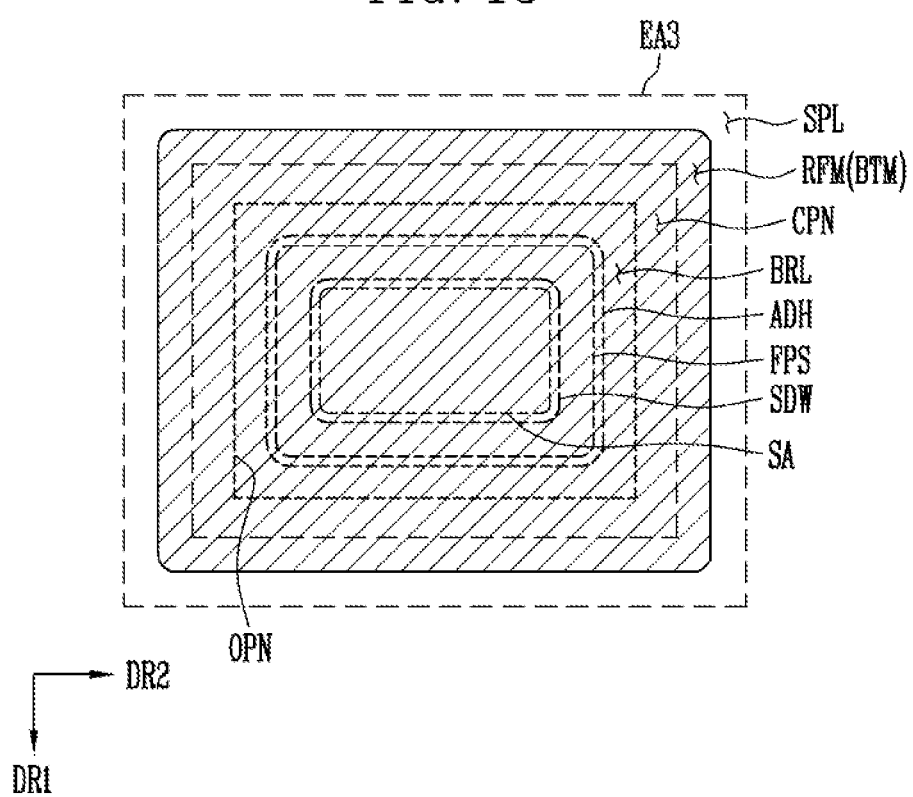
FIG. 13 is a plan view illustrating area EA3 shown in FIG. 12.

FIG. 12 is an enlarged sectional view illustrating still another embodiment of the area EA1 shown in FIG. 6. FIG. 13 is a plan view illustrating area EA3 shown in FIG. 12. For example, FIGS. 12 and 13 illustrate a modification of the embodiment shown in FIGS. 7 and 8, and particularly, illustrate a modification of the reinforcing member RFM and the support member SPL. In the embodiment shown in FIGS. 12 and 13, detailed descriptions of components similar or identical to those of the above-described embodiment (e.g., the embodiment shown in FIGS. 7 and 8) will be omitted.

Referring to FIGS. 12 and 13, the bottom surface BTM of the reinforcing member RFM may extend up to a peripheral area of the opening OPN of the cover panel CPN with a width wider than a width of the opening OPN of the cover panel CPN. For example, the bottom surface BTM of the reinforcing member RFM may extend to have a width wider than a width of the opening OPN of the cover panel CPN in the first direction DR1 and/or the second direction DR2, to be in contact with the rear surface of the absorbing layer ABL at the periphery of the opening OPN of the cover panel CPN. For example, the reinforcing member RFM may be disposed in an area including the area in which the fingerprint sensor FPS is disposed while with an area greater than an area of the fingerprint sensor FPS when viewed on a plane. In an embodiment, the bottom surface BRM of the reinforcing member FPS may be attached to the periphery of the opening OPN of the cover panel CPN by an adhesive, the bottom surface BRM of the reinforcing member FPS may maintain a state in which the bottom surface BRM of the reinforcing member FPS is in contact with the cover panel CPN by an insertion structure, etc.

The support member SPL may have an opening OPNs corresponding to the reinforcing member RFM. For example, the support member SPL may have the opening OPNs with a size corresponding to a size of the bottom surface BTM of the reinforcing member RFM, and the reinforcing member RFM may be inserted into the opening OPNs. The reinforcing member RFM may be mechanically coupled to the cover panel CPN (particularly, the support member SPL).

In accordance with the above-described embodiment, the separation distance (e.g., the first distance d1) between the sensor layer SSL and the bottom surface BTM of the reinforcing member RFM can be increased without increasing the thickness of the display device DD. Accordingly, a thicker air layer can be formed on the rear surface of the fingerprint sensor FPS.

Figure 14:
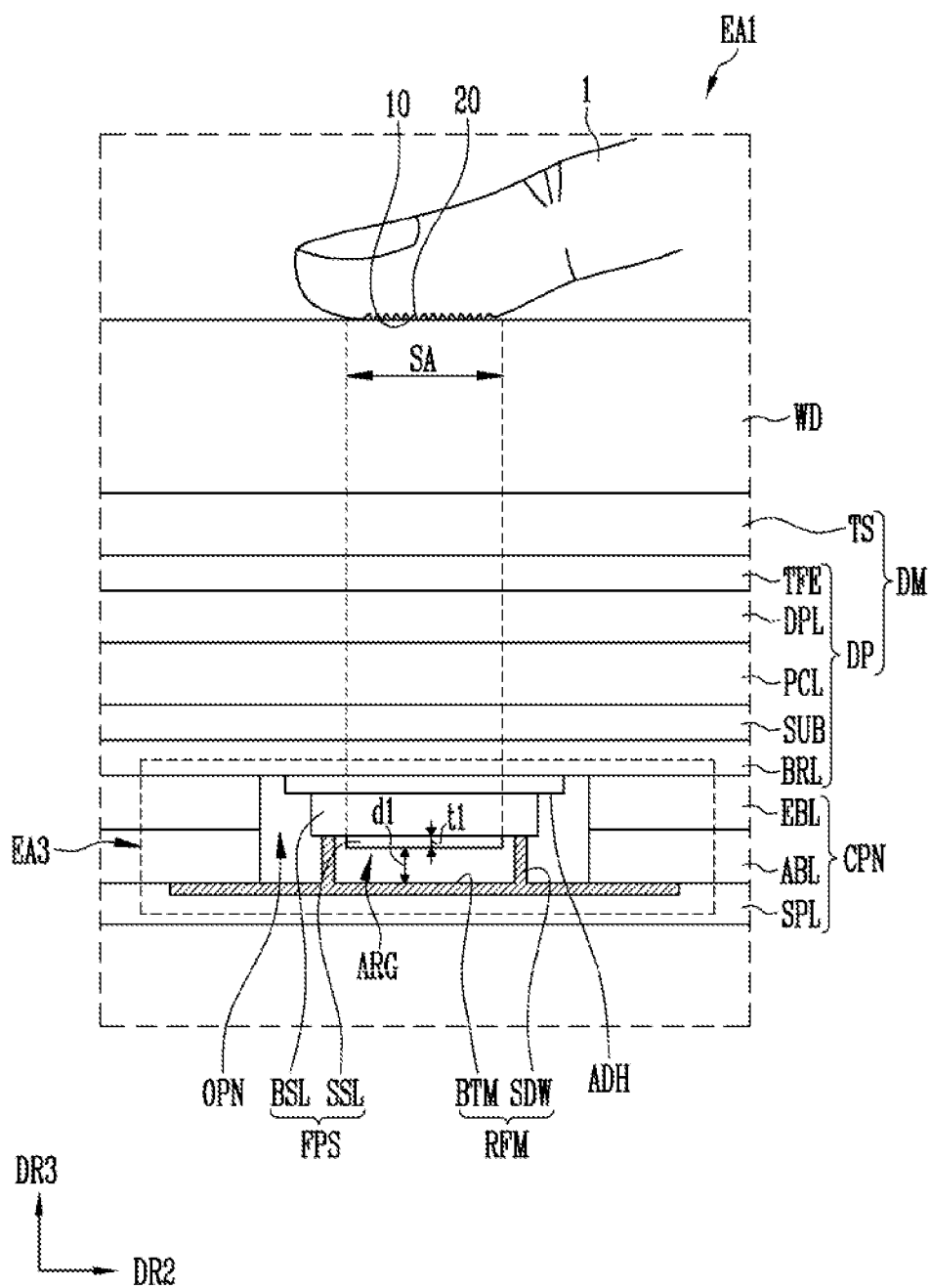
FIG. 14 is an enlarged sectional view illustrating still another embodiment of the area EA1 shown in FIG. 6.
Figure 15:
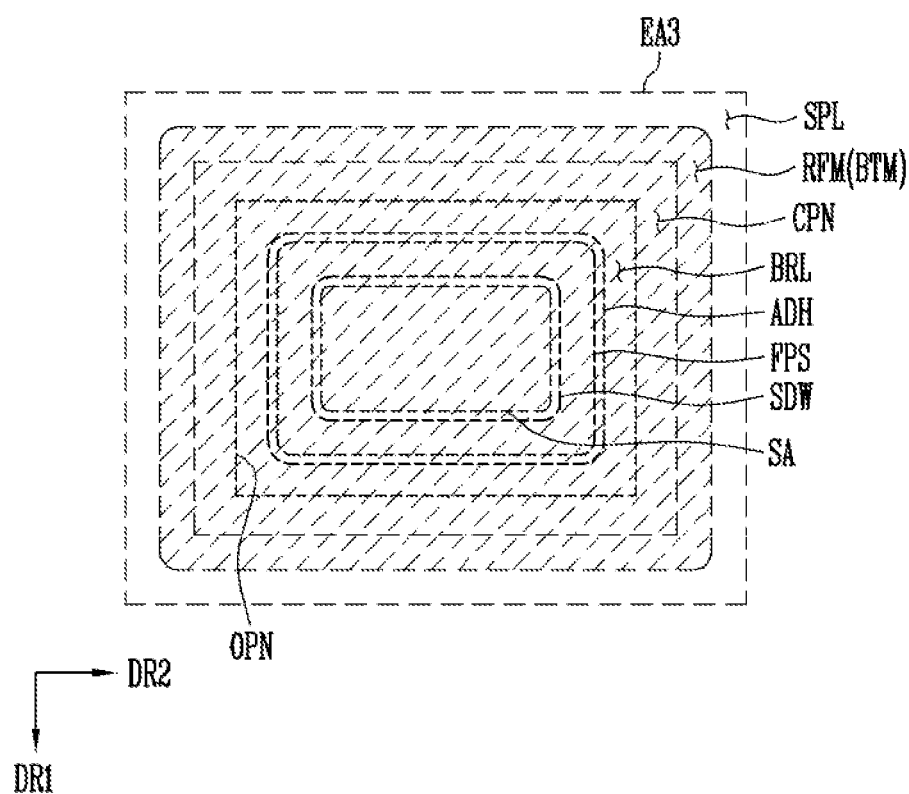
FIG. 15 is a plan view illustrating area EA3 shown in FIG. 14.

FIG. 14 is an enlarged sectional view illustrating still another embodiment of the area EA1 shown in FIG. 6. FIG. 15 is a plan view illustrating area EA3 shown in FIG. 14. For example, FIGS. 14 and 15 illustrate a modification of the embodiment shown in FIGS. 7 and 8, and particularly, illustrate a modification of the support member SPL. In the embodiment shown in FIGS. 14 and 15, detailed descriptions of components similar or identical to those of the above-described embodiment (e.g., the embodiment shown in FIGS. 12 and 13) will be omitted.

Referring to FIGS. 14 and 15, the support member SPL may be formed to support the bottom of the reinforcing member RFM even when the bottom surface BTM of the reinforcing member RFM extends up to a peripheral area of the opening OPN of the cover panel CPN. For example, the support member SPL may be disposed on the reinforcing member RFM and the rear surface of the absorbing layer ABL while a groove in which the bottom surface BTM of the reinforcing member RFM is mounted. In another embodiment, when the bottom surface BTM of the reinforcing member RFM has a sufficiently thin thickness, the support member SPL may be disposed on the reinforcing member RFM and the rear surface of the absorbing layer ABL without any groove corresponding to the reinforcing member RFM. In accordance with the above-described embodiment, the reinforcing member RFM can be more stably supported.

In accordance with the present disclosure, the display device includes a reinforcing member disposed on a rear surface of a fingerprint sensor to be spaced apart from a sensor layer of the fingerprint sensor. Accordingly, an air gap is secured between the sensor layer of the fingerprint sensor and the reinforcing member, so the mechanical strength of the display device can be increased by the reinforcing member while ensuring the sensitivity of the fingerprint sensor.

Example embodiments have been disclosed herein, and although specific terms are employed, the example embodiments are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
a display panel including a display area;
a cover panel disposed on a rear surface of the display panel, wherein
the cover panel includes an upper layer and a support member, and wherein
the upper layer includes an opening surrounding a sensing area of the display panel in a plan view;
a fingerprint sensor disposed on the rear surface of the display panel in the opening of the cover panel, wherein
the fingerprint sensor includes a base layer and a sensor layer; and
a reinforcing member disposed on a rear surface of the base layer, wherein
the reinforcing member includes a sidewall and a bottom portion that extends from the sidewall, wherein
the sidewall surrounds the sensor layer in each direction in the plan view, and overlaps the base layer in the plan view, wherein
the sidewall is spaced apart from the sensor layer and from the upper layer of the cover panel in each direction in the plan view, wherein
the bottom portion of the reinforcing member overlaps the support member in the plan view and is spaced apart from a rear surface of the sensor layer in a sectional view, wherein
the reinforcing member is spaced apart from the sensor layer by an air gap that extends from the rear surface of the sensor layer to the bottom portion of the reinforcing member in the sectional view, and wherein
the base layer surrounds the sidewall of the reinforcing member in each direction of the plan view.

2. The display device of claim 1, wherein the sensor layer includes an ultrasonic sensor layer.

3. The display device of claim 1, wherein the support member is disposed on a rear surface of the reinforcing member to support the reinforcing member.

4. The display device of claim 3, wherein the support member is a plate-shaped member in direct contact with the rear surface of the reinforcing member.

5. The display device of claim 3, wherein the support member is a metal plate.

6. The display device of claim 1, wherein the sidewall of the reinforcing member is disposed on an edge area of the rear surface of the fingerprint sensor and the reinforcing member is spaced apart from the sensor layer at a distance of at least 1 μm.

7. The display device of claim 1, wherein the sidewall of the reinforcing member surrounds one or more side surfaces of the sensor layer.

8. The display device of claim 1, wherein the sidewall of the reinforcing member includes at least one opening and at least partially surrounds one or more side surfaces of the sensor layer.

9. The display device of claim 1, wherein the reinforcing member is configured with a plurality of sub-reinforcing members that are separated from each other and disposed in a distributed manner on the rear surface of the fingerprint sensor.

10. The display device of claim 1, wherein a width of the bottom portion of the reinforcing member is less than a width of the base layer of the fingerprint sensor and the bottom portion of the reinforcing member is disposed in a plane view area in which the fingerprint sensor is disposed.

11. The display device of claim 1, wherein an area of the bottom portion of the reinforcing member is greater than an area of the sensor layer and the bottom portion of the reinforcing member is disposed in a plane view area including a sensing area in which the sensor layer is disposed.

12. The display device of claim 1, wherein the bottom portion of the reinforcing member extends up to a peripheral area of the opening and a width of the bottom portion of the reinforcing member is greater than a width of the opening of the cover panel.

13. The display device of claim 12, wherein the support member is disposed at a lower end portion of the cover panel and the support member has an opening corresponding to the reinforcing member.

14. The display device of claim 1, wherein the fingerprint sensor is disposed in the display area when viewed on a plane.

15. The display device of claim 1, wherein a space in which the air gap is formed is disposed between the sensor layer and the reinforcing member.

16. The display device of claim 1, wherein the display area includes a flexible bending area.

17. A display device comprising:
a display panel including a display area;
a cover panel disposed on a rear surface of the display panel, the cover panel including an upper layer and a support member, and the upper layer including an opening surrounding a sensing area of the display panel in a plan view;
a fingerprint sensor disposed on the rear surface of the display panel in the opening of the cover panel, wherein the fingerprint sensor includes a base layer and a sensor layer; and
a reinforcing member disposed on a rear surface of the base layer, wherein
the reinforcing member includes a sidewall and a bottom portion that extends from the sidewall, wherein
the sidewall surrounds the sensor layer in each direction in the plan view, and overlaps the base layer in the plan view, wherein
an outer surface of the sidewall that is opposite to an inner surface of the sidewall facing the sensor layer is perpendicular to the rear surface of the fingerprint sensor in a sectional view, wherein
the sidewall is spaced apart from the sensor layer and from the upper layer of the cover panel in each direction in the plan view, wherein
the bottom portion of the reinforcing member overlaps the support member in the plan view and is spaced apart from a rear surface of the sensor layer in the sectional view, wherein
the reinforcing member is spaced apart from the sensor layer by an air gap extending from the sensor layer to the bottom portion in the sectional view, and wherein
the base layer surrounds the sidewall of the reinforcing member in each direction of the plan view.

18. A method of manufacturing a display device, comprising:
providing a display panel including a display area;
providing a cover panel disposed on a rear surface of the display panel, the cover panel including an upper layer and a support member, and the upper layer including an opening surrounding a sensing area of the display panel in a plan view;
providing a fingerprint sensor disposed on the rear surface of the display panel in the opening of the cover panel, wherein the fingerprint sensor includes a base layer and a sensor layer; and
providing a reinforcing member disposed on a rear surface of the base layer, wherein
the reinforcing member includes a sidewall and a bottom portion that extends from the sidewall, wherein
the sidewall is disposed on a rear surface of the fingerprint sensor around the sensor layer in each direction in the plan view, and overlaps the base layer in the plan view, wherein
the sidewall is spaced apart from the sensor layer in each direction in the plan view, wherein
the bottom portion of the reinforcing member overlaps the support member in the plan view, wherein
the reinforcing member is spaced apart from the sensor layer by an air gap that extends from the sensor layer to the bottom portion in a sectional view, and wherein
the base layer surrounds the sidewall of the reinforcing member in each direction of the plan view.

* * * * *